United States Patent
Du

(10) Patent No.: US 11,517,970 B2
(45) Date of Patent: Dec. 6, 2022

(54) METHOD AND SYSTEM FOR TIN IMMERSION AND SOLDERING OF CORE WIRE

(71) Applicant: GOERTEK INC., Shandong (CN)

(72) Inventor: Gang Du, Weifang (CN)

(73) Assignee: GOERTEK INC., Weifang (CN)

( * ) Notice: Subject to any disclaimer, the term of this patent is extended or adjusted under 35 U.S.C. 154(b) by 279 days.

(21) Appl. No.: 16/756,825

(22) PCT Filed: Dec. 14, 2017

(86) PCT No.: PCT/CN2017/116176
§ 371 (c)(1),
(2) Date: Apr. 16, 2020

(87) PCT Pub. No.: WO2019/085177
PCT Pub. Date: May 9, 2019

(65) Prior Publication Data
US 2020/0254550 A1    Aug. 13, 2020

(30) Foreign Application Priority Data
Oct. 30, 2017 (CN) .......................... 201711052587.0

(51) Int. Cl.
*B23K 1/00*    (2006.01)
*B23K 1/08*    (2006.01)
*B23K 101/32*  (2006.01)

(52) U.S. Cl.
CPC ............ *B23K 1/08* (2013.01); *B23K 2101/32* (2018.08)

(58) Field of Classification Search
CPC . B23K 1/20; B23K 1/08; B23K 1/206; B23K 2101/32; C25D 5/10; C25D 7/0607
See application file for complete search history.

(56) References Cited

U.S. PATENT DOCUMENTS 3,954,572 A * 5/1976 Ziegler ............... H01L 39/2409
                                              205/228
4,756,467 A * 7/1988 Schatzberg .......... B23K 35/001
                                              228/208

(Continued)

FOREIGN PATENT DOCUMENTS

CN    101448372 A    6/2009
CN    102957077 A    3/2013

(Continued)

OTHER PUBLICATIONS

Chinese Office Action dated Mar. 25, 2019 as recieved in Application No. 201711052587.0.

*Primary Examiner* — Erin B Saad
(74) *Attorney, Agent, or Firm* — Maschoff Brennan

(57) ABSTRACT

Disclosed are a method and a system for tin immersion and soldering of a core wire which includes: inserting a core wire row into molten tin vertically; moving the each core wire in the molten tin along a direction perpendicular to the core wire row to remove carbonized matter from each core wire on a moving direction side; pulling the each core wire out of the molten tin; and performing alignment, such that the inner core conductor of the each core wire on the moving direction side contacts with a bonding pad. According to the technical solution of the present disclosure, the carbonized matter on the core wire that aligned facing the bonding pad is removed, such that the temperature transfer effect of the automatic soldering is improved, the yield of the automatic soldering is improved, and the consistency and the yield of the automatic soldering are more stable.

12 Claims, 3 Drawing Sheets

(56) References Cited

U.S. PATENT DOCUMENTS

| | | | | |
|---|---|---|---|---|
| 8,838,194 B2 * | 9/2014 | Calvert | ................ | H01L 39/141 |
| | | | | 505/231 |
| 8,914,087 B1 * | 12/2014 | Calvert | ................ | H01L 39/141 |
| | | | | 505/231 |
| 2007/0194870 A1 * | 8/2007 | Takahashi | ............... | H01L 39/20 |
| | | | | 335/216 |
| 2014/0038828 A1 * | 2/2014 | Calvert | .................. | H01L 39/02 |
| | | | | 505/231 |
| 2020/0254550 A1 * | 8/2020 | Du | ........................ | B23K 1/206 |

FOREIGN PATENT DOCUMENTS

| CN | 103259151 A | 8/2013 |
|---|---|---|
| CN | 104480421 A | 4/2015 |
| CN | 105081499 A | 11/2015 |
| JP | 2000111468 A | 4/2000 |

\* cited by examiner

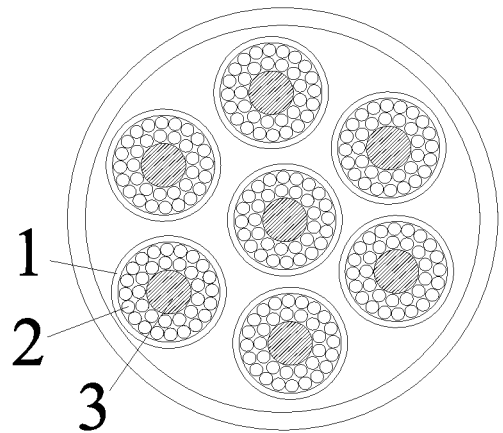

FIG. 1

```
inserting a core wire row into molten tin vertically to melt an     — S101
insulation skin on each core wire of the core wire row and
complete pre-tinning of an inner core conductor
              │
              ▼
moving the each core wire in the molten tin along a direction      — S102
perpendicular to the core wire row to remove carbonized
matter from the each core wire on a moving direction side
              │
              ▼
pulling the each core wire out of the molten tin                   — S103
              │
              ▼
performing alignment, such that the inner core conductor of        — S104
the each core wire on the moving direction side is
respectively in contact with a bonding pad
```

FIG. 2

METHOD AND SYSTEM FOR TIN IMMERSION AND SOLDERING OF CORE WIRE

CROSS-REFERENCE TO RELATED APPLICATION

The present disclosure claims priority to Chinese Patent Application No. 201711052587.0, entitled "a method and a system for tin immersion and soldering of core wire", filed on Oct. 30, 2017, which is incorporated herein by reference in its entirety.

FIELD

The present disclosure relates to the field of processing and manufacturing technology, and in particular, to a method and a system for tin immersion and soldering of core wire.

BACKGROUND

With the development of the electronics industry, products tend to be miniaturized and complicated, and products with wires make the number of core wires more and more due to functional requirements. At present, the soldering of a plurality of strands of core wires is mostly completed by automatic soldering.

However, the core wire may generate carbonized matter during tin immersion, which will cause a gap between the bonding pad and the core wire during the automatic soldering process. Under the condition that time and the temperature of the automatic soldering are fixed, the soldering in this state is extremely unfavorable to the transfer of temperature, resulting in extremely poor stability of the automatic soldering.

SUMMARY

In view of this, the present disclosure provides a method and a system for immersion soldering of core wires to improve the temperature transfer of the automatic soldering.

In order to solve the technical problems in the prior art, the present disclosure provides a method for tin immersion and soldering of core wire, including:

inserting a core wire row into molten tin vertically to melt an insulation skin on each core wire of the core wire row and complete pre-tinning of an inner core conductor;

moving the each core wire in the molten tin along a direction perpendicular to the core wire row to remove carbonized matter from the each core wire on a moving direction side;

pulling the each core wire out of the molten tin; and performing alignment, such that the inner core conductor of the each core wire on the moving direction side is respectively in contact with a bonding pad.

Optionally, the inserting a core wire row into molten tin vertically includes:

performing regular arranging and straightening on solder ends of a plurality of strands of core wires to obtain the core wire row; and inserting the core wire row into the molten tin vertically for 1 to 3 seconds.

Optionally, a temperature of the molten tin is 380° C. to 420° C.

Optionally, the moving the each core wire in the molten tin along a direction perpendicular to the core wire row includes:

moving the each core wire for 1 to 2 seconds.

Optionally, the moving the each core wire in the molten tin along a direction perpendicular to the core wire row comprises:

moving the each core wire for 20 to 40 mm.

Optionally, the pulling the each core wire out of the molten tin includes:

pulling the each core wire out of the molten tin within 0.1 to 0.3 seconds.

Optionally, the method further includes:

soldering the each core wire and the bonding pad after an alignment is performed.

Accordingly, the present disclosure further provides a system for tin immersion and soldering of core wire, including:

a wiring tooling, on which a core wire row is mounted;

a driving device, connected to the wiring tooling, for driving the wiring tooling to go down along a vertical direction to: insert the core wire row into molten tin vertically to melt an insulation skin on each core wire of the core wire row and complete pre-tinning of an inner core conductor; move the each core wire in the molten tin along a direction perpendicular to the core wire row to remove carbonized matter from the each core wire on a moving direction side; and pull the each core wire out of the molten tin; and a soldering and alignment device, connected to the wiring tooling, for driving the wiring tooling to move to perform alignment, such that the inner core conductor of the each core wire on the moving direction side is respectively in contact with a bonding pad.

Optionally, the driving device includes:

a lifting performing member, for driving the wiring tooling at a set speed to go down along a vertical direction to insert the core wire row into the molten tin vertically for 1 to 3 seconds, and pull the each core wire out of the molten tin within 0.1 to 0.3 seconds; and a horizontal moving performing member, for driving the wiring tooling within 1 to 2 seconds to move for 20 to 40 mm along a direction perpendicular to the core wire row.

Further optionally, the system further includes: a soldering device, for soldering the each core wire and the bonding pad after an alignment is performed.

According to the technical solution of the present disclosure, the carbonized matter is effectively removed by moving the each core wire in the molten tin along a direction perpendicular to the core wire row. There is carbonized matter blocked between the bonding pad and the core wire, after the alignment is performed, such that the inner core conductor of the each core wire on the moving direction side is respectively in contact with a bonding pad. Thereby, the temperature transfer effect of the automatic soldering is improved, the yield of the automatic soldering is greatly improved, and the consistency and the yield of the automatic soldering are more stable.

BRIEF DESCRIPTION OF THE DRAWINGS

In order to describe the technical solutions in the embodiments of the present disclosure or the prior art more clearly, the drawings required to be used for descriptions about the embodiments or the prior art will be simply introduced below. It is apparent that the drawings described below are some embodiments of the present disclosure. Those of ordinary skill in the art may further obtain other drawings according to these drawings without creative work.

The drawings described herein are used to provide a further understanding of the present disclosure and constitute a part of the present disclosure. The example embodiments of the present disclosure and the descriptions thereof are used to explain the present disclosure, and do not constitute an improper limitation on the present disclosure.

In the drawings:

FIG. 1 is a schematic diagram of a cross-sectional structure of a core wire in the prior art;

FIG. 2 is a schematic flowchart of a method for tin immersion and soldering of core wire of the present disclosure;

FIG. 3 is a schematic diagram of a work flow of tin immersion of a core wire of the present disclosure;

FIG. 4 is a partial enlarged view of the core wire and the bonding pad being aligned after tin immersion of a core wire is completed of the present disclosure; and FIG. 5 is a schematic diagram of a work flow of soldering of a core wire of the present disclosure.

Figure 3:
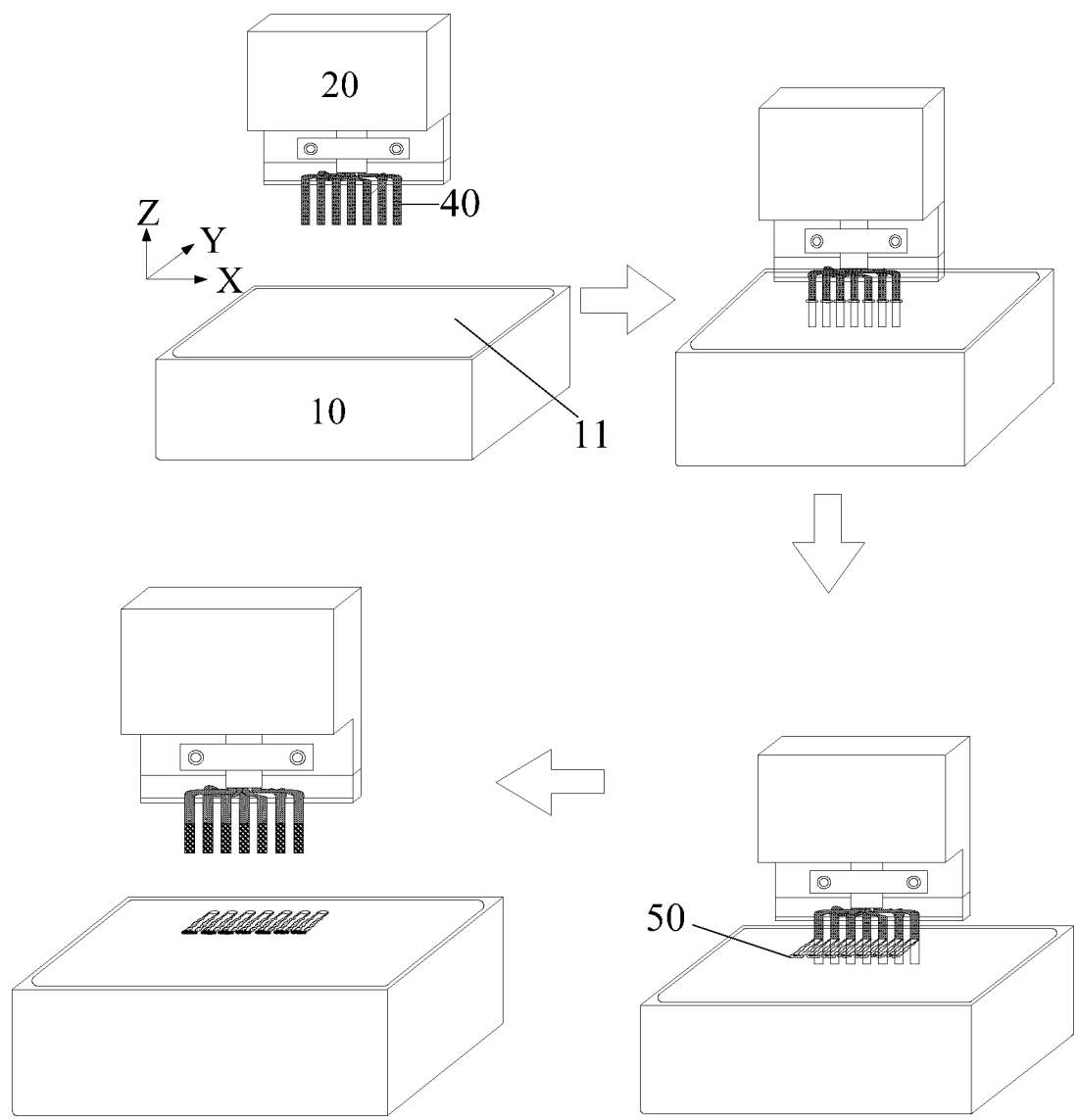

1: insulation layer; 2: copper wire; 3: anti-break wire;
10: tin furnace; 11: molten tin; 20: wiring tooling; 30: high-temperature head; 40: core wire row; 50: carbonized matter; 60: bonding pad.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In some of the processes described in the description, claims, and the above drawings of the present disclosure, a plurality of operations occurring in a particular order are included, which may be performed out of the order herein or be performed in parallel. The sequence numbers of the operations, such as 101, 102, etc., are merely used to distinguish between the various operations, and the sequence numbers themselves do not represent any order of execution. In addition, the processes may include more or fewer operations, and the operations may be performed sequentially or in parallel. It should be noted that the expressions herein of "first", "second", etc. are intended to distinguish between different messages, devices, modules, etc., and are not intended to represent a sequential order, nor is it intended to limit that "first" and "second" are of different types.

The inventor discovered in the process of implementing the present disclosure that more and more core wires are currently used in the wire. As shown in FIG. 1, there is a plurality of strands of core wires inside the wire. The core wire is wrapped by the insulation layer 1 on the outside, and includes a plurality of strands of copper wires 2 and an anti-break wire 3. The insulation layer generally adopts TPE insulation film (Thermoplastic Elastomer) or an enameled layer for insulation protection. Therefore, it is necessary to melt the insulation layer wrapped outside by tin immersion before soldering to complete pre-tinning of an inner copper wire, so as to achieve the soldering of next step. However, due to the need for insulation between the core wires, it is difficult to find one kind of material of the insulation film that is easily melted and volatilized. Even if the insulation film has good performance when being melted and volatilized, it is also difficult to be completely volatilized. Besides, the insulation film with good performance when being volatilized may introduce to a risk of short circuit, due to badly affected insulation effect between the core wires caused by thermal conductivity factor during tin immersion process. Carbonized matter may be generated during the tin immersion process, which will cause a gap between the bonding pad and the core wire. Since the time and the temperature of the automatic soldering are fixed, the carbonized matter may bring bad effect on the temperature transfer during the automatic soldering.

Therefore, in order to solve the defects in the prior art, the present disclosure provides a method for tin immersion and soldering of core wire to improve the temperature transfer of the automatic soldering.

The implement of the present disclosure will be described in detail with reference to the accompanying drawings and embodiments, so as to fully understand and implement the implementation process of how to apply technical means to solve technical problems and achieve technical effects in the present disclosure. The structure of the present disclosure is further described below with reference to the drawings.

FIG. 2 is a schematic flowchart of a method for tin immersion and soldering of core wire of the present disclosure, as shown in FIG. 2.

The present disclosure provides a method for tin immersion and soldering of core wire, including:

Step S101: inserting a core wire row into molten tin vertically to melt an insulation skin on each core wire of the core wire row and complete pre-tinning of an inner core conductor.

During soldering, the soldering head is directly pressed downward to perform soldering of the core wire. In order to ensure that the insulation skin on the side where the core wire is in contact with the bonding pad and insulation skin on the side where the core wire is in contact with the soldering head are all melted, the core wire row needs to be inserted into the molten tin vertically. Before the core wire row is inserted into the molten tin, the wire where the core wire row is located needs to be undergone the wire end cut treatment in order to remove the wire skin. The wire end cut treatment may be processed by a cutting tooling or laser cutting.

Step S102: moving the each core wire in the molten tin along a direction perpendicular to the core wire row to remove carbonized matter from the each core wire on a moving direction side.

By moving each core wire along one direction that is perpendicular to the core wire row, it is possible to ensure that the carbonized matter on the same side of each core wire is removed by the friction resistance between the molten tin and the carbonized matter.

Step S103: pulling the each core wire out of the molten tin.

After each core wire is pulled out, the pre-tinning of each core wire has completed, and the carbonized matter on the core conductor on the moving direction side of each core wire has been removed. There may be a little carbonized matter remains on the core conductor on the side opposite to the moving direction side, but it can be removed during the soldering process without affecting the soldering.

Step S104: performing alignment, such that the inner core conductor of the each core wire on the moving direction side is respectively in contact with a bonding pad.

After each core wire is pulled out of the molten tin, make the side of the each core wire has no carbonized matter be in contact with the bonding pad in order to ensure the transfer of soldering temperature. The pre-plated tin on the core wire and the tin point on the bonding pad satisfy the heat transfer. Final melting and soldering are then completed.

According to the technical solution of the present disclosure, the carbonized matter is effectively removed by moving the each core wire in the molten tin along a direction perpendicular to the core wire row. There is carbonized matter blocked between the bonding pad and the core wire, after the alignment is performed, such that the inner core conductor of the each core wire on the moving direction side is respectively in contact with a bonding pad. Thereby, the temperature transfer effect of the automatic soldering is improved, the yield of the automatic soldering is greatly improved, and the consistency and the yield of the automatic soldering are more stable.

The method for tin immersion and soldering of core wire of the present disclosure is further described in detail below.

For step S101, in order to ensure that the core wire row can be inserted into the molten tin vertically, the core wire needs to be processed before the tin immersion of the core wire. Specifically, inserting the core wire into the molten tin vertically includes: performing regular arranging and straightening on solder ends of a plurality of strands of core wires to obtain the core wire row; and inserting the core wire row into the molten tin vertically.

During inserting into the molten tin, the depth of the core wire row that inserted into molten tin should be pre-set according to the reserved assembly size of the core wire. If the insertion is too deep, after the soldering of the core wire and the bonding pad, the core wire row may be exposed to the outside too much. This affects the service life of the core wire row. If the insertion is too short, the core wire and the bonding pad may not be completely welded, and the core wire row and the bonding pad may be easy to fall off, which affects the use of the product.

In the process of inserting into the molten tin, the insulation skin on the surface of the core wire is melted under high temperature. At this time, a circle of carbonized matter around the core wire is formed on the surface of the molten tin. In order to ensure the effect of tin immersion, the temperature of the molten tin and the time for inserting the core wire row need to be controlled according to the melting point of the insulation skin. The insulation skin of the core wire generally adopts TPE insulation film (Thermoplastic Elastomer) or an enameled layer for insulation protection. Therefore, in the present disclosure, in order to ensure the effect of tin immersion, the core wire row is inserted into the molten tin vertically for 1 to 3 seconds, and the temperature of the molten tin is 380° C. to 420° C.

When the temperature is lower than 380° C. or the time is too short, the TPE insulation film or the enameled layer is difficult to melt or is not melted thoroughly, which ultimately affects the immersion tin effect. When the temperature is higher than 420° C. or the action time is too long, the core wire is finally heated up, which eventually causes some of the core conductors to melt, and eventually the overall core wire diameter becomes smaller. The core wire diameter becomes smaller, eventually leading to poor soldering of the automatic soldering.

For step S102, the purpose of moving each core wire along a direction perpendicular to the core wire row is to ensure that at least the carbonized matter on the core wire on the moving direction side is removed. During the movement process, the core wire row drags the carbonized matter, and when the carbonized matter is dragged, an increasingly scarce band-shaped carbonized matter is formed. The surface of the inner core conductor on the side of the moving direction is scratched in the molten tin. Due to the effects of resistance and friction, the surface carbonized matter is continuously reduced to no, and finally the surface of the core wire on the side of the moving direction becomes smooth. The side of the core wire that is opposite to the moving direction and sides of the core wire do not undergo the front friction blocking of the molten tin, and there may still a little carbonized matter stating thereon.

If the core wire moves in the molten tin for a long time, the relative speed will be too low. The resistance friction on the moving direction side of the core wire is eventually affected, resulting in poor removal effect of the carbonized matter. In addition, the long-term immersion of tin also causes the core wire to melt, which may change the wire diameter of the core wire and ultimately affect soldering. In contrast, when the horizontal sliding time is short or the distance is short, the effect of removing carbonized matter is affected. Therefore, in the technical solutions according to the present disclosure the specific implement may include:

moving the each core wire in the molten tin along a direction perpendicular to the core wire row for 1 to 2 seconds.

Further, in order to ensure better removal of carbonized matter on the surface of the core conductor on the moving direction side, it is necessary to control the moving distance. Optionally, the each core wire is moved in the molten tin along a direction perpendicular to the core wire row by 20 to 40 mm.

After the core wire is moved, the core wire row is quickly pulled out of the molten tin to prevent carbonized matter from sticking to the core wire again. In the present disclosure, optionally, the each core wire is pulled out of the molten tin within 0.1 to 0.3 seconds. After the core wire is pulled out, carbonized matter remains on the molten tin, and the inner conductor of the core wire is pre-tinned.

After the above operations, the pre-tinning process of the core wire has been completed, and then step S104 is to be performed. The side of the core wire with no carbonized matter is in contact with the bonding pad to complete the alignment. The each core wire and the bonding pad after aligned are performed soldering.

Solder the core wires and bonding pads that have been aligned.

For example, soldering is performed using a Hotbar (Hot Pressing Tin Melting Soldering) process. After the core wire and the bonding pad are aligned, they are then transferred to the Hotbar soldering station. When the high-temperature head goes down, it will preferentially contact the carbonized matter residue on the side of the core wire opposite to the moving direction side. The high temperature of the high-temperature head instantly melts the carbonized matter, and under the action of continuous downward pressure, the carbonized matter is squeezed out of the groove of the head. The temperature transfer is not subject to excessive interference. The tin of the core wire and the tin point of the bonding pad all satisfy the heat transfer. Final melting and soldering are then completed.

Accordingly, the present disclosure further provides a system for tin immersion and soldering of core wire, including:

a wiring tooling, on which a core wire row is mounted;

a driving device, connected to the wiring tooling, for driving the wiring tooling to go down along a vertical direction to: insert the core wire row into molten tin vertically to melt an insulation skin on each core wire of the core wire row and complete pre-tinning of an inner core conductor; move the each core wire in the molten tin along a direction perpendicular to the core wire row to remove carbonized matter from the each core wire on a moving direction side; and pull the each core wire out of the molten tin; and a soldering and alignment device, connected to the wiring tooling, for driving the wiring tooling to move to perform alignment, such that the inner core conductor of the each core wire on the moving direction side is respectively in contact with a bonding pad.

Optionally, the driving device includes:

a lifting performing member, for driving the wiring tooling at a set speed to go down along a vertical direction to insert the core wire row into the molten tin vertically for 1 to 3 seconds, and pull the each core wire out of the molten tin within 0.1 to 0.3 seconds; and a horizontal moving performing member, for driving the wiring tooling within 1 to 2 seconds to move for 20 to 40 mm along a direction perpendicular to the core wire row.

In addition, the system further includes: a soldering device, for soldering the each core wire and the bonding pad after an alignment is performed.

The following describes how to apply the system for tin immersion and soldering of core wire according to the application scenario.

As shown in FIG. 3, the immersion tin process:

Firstly, solder ends of a plurality of strands of core wires are performed regular arranging and straightening, and the core wire row 40 is installed on the wiring tooling 20.

Secondly, the driving device (not shown in the figure) drives the wiring tooling 20 through a lifting performing member to go down along a vertical direction (Z direction in the figure) to insert the core wire row 40 into the molten tin 11 vertically. (The molten tin 11 is heated to a preset temperature in the tin furnace 10) At this time, the insulation skin on each core wire of the core wire row 40 is melted by the molten tin 11. At this time, a circle of carbonized matter 50 around the core wire is formed on the surface of the molten tin 11.

Again, the driving device drives the wiring tooling 20 through a horizontal moving performing member to move each core wire in the molten tin 11 along a direction perpendicular to the core wire row 40. At this time, the core wire row 40 drags the carbonized matter 50, and when the carbonized matter 50 is dragged, an increasingly scarce band-shaped carbonized matter 50 is formed. The carbonized matter 50 on each core wire in the moving direction side is removed.

Then, the driving device drives the wiring tooling 20 through the lifting performing member to pull each core wire out of the molten tin 11.

Finally, the carbonized matter 50 remains on the molten tin 11, and the inner conductor of the core wire is pre-tinned.

Figure 4:
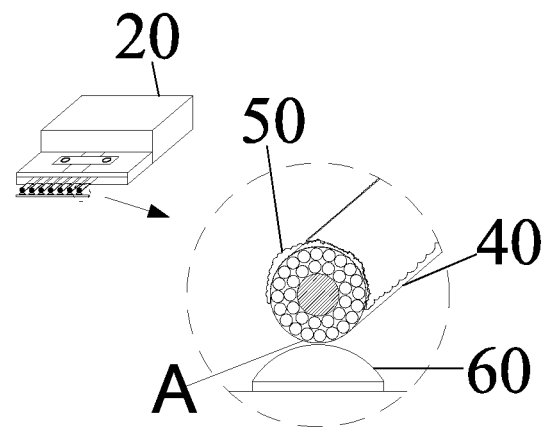

As shown in FIG. 4, the alignment process:

A soldering and alignment device (not shown in the figure) drives the wiring tooling 20 to contact the inner core conductor of each core wire on the moving direction side (A side in the figure) with the bonding pad 60 to complete the alignment.

If the alignment is wrong and most of the carbonized matter 50 appears between the core wire and the tin point of the bonding pad 60, a gap will be generated. When the high-temperature 30 goes down, the tin of the core wire needs to absorb heat to melt. However, in the process of heat conduction, the heat cannot be transferred to the tin point of the bonding pad 60 timely due to the remaining carbonized matter 50. Therefore, under fixed soldering parameters (soldering temperature and soldering time), there will be a great poor soldering due to poor or insufficient heat transfer.

Figure 5:
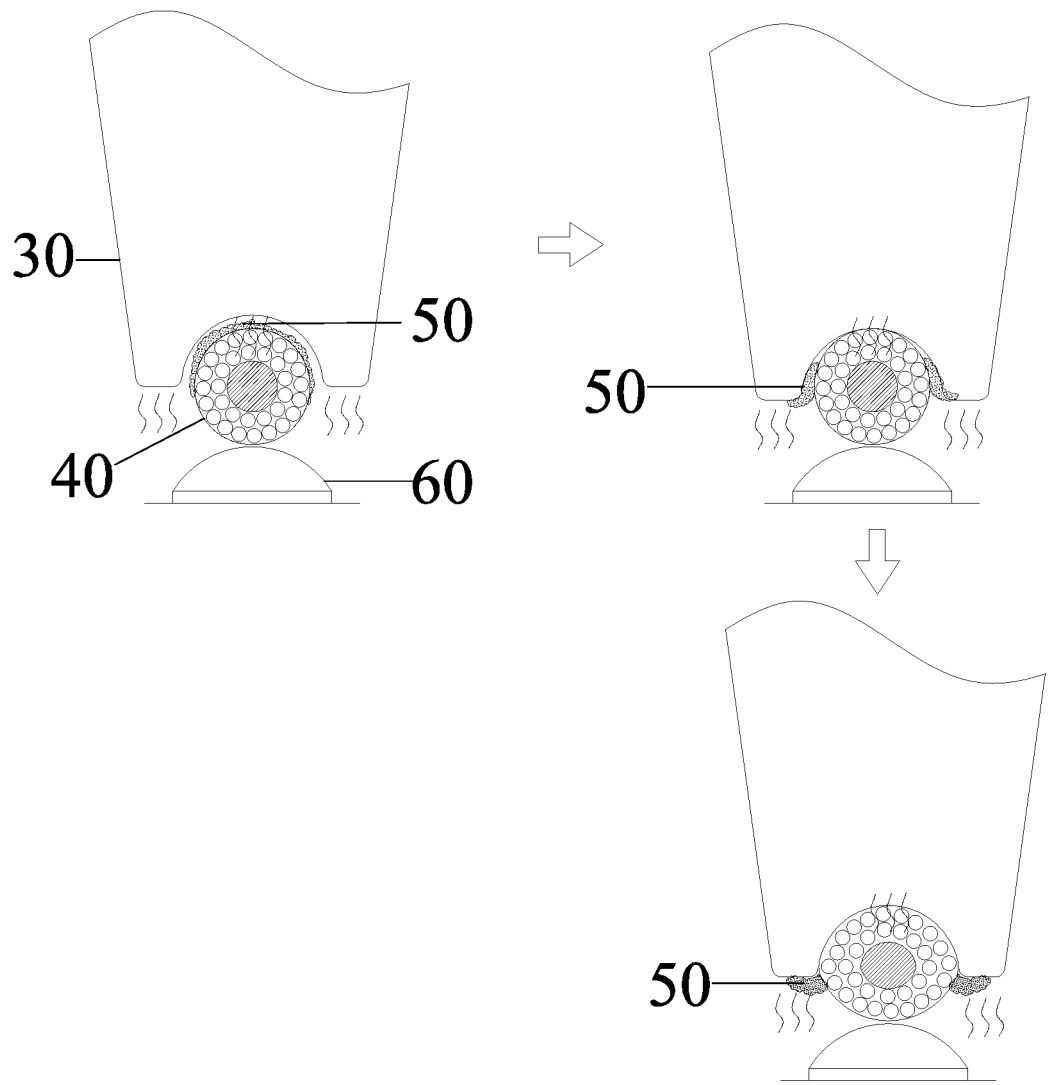

As shown in FIG. 5, the soldering process:

After the core wire and the bonding pad 60 are aligned, they are transferred to the soldering station, and the soldering is completed by the soldering device.

Firstly, the high-temperature head 30 of the soldering device goes down, and preferentially contacts the residue of the carbonized matter 50 on the side of the core line opposite to the moving direction side. The high temperature of the high-temperature head 30 instantly melts the carbonized matter 50.

Secondly, the high-temperature head 30 continues to move downward, and under pressure, the carbonized matter 50 is gradually squeezed out of the groove of the head.

Finally, the high-temperature head 30 is in contact with the core wire, and the temperature transfer between the high-temperature head 30 and the core wire is not subject to much interference. The tin of the core wire and the tin point of the bonding pad 60 satisfy the heat transfer. Final melting and soldering are then completed.

The system in present embodiment can execute the method in above embodiment. For implementation principles and technical effects, please refer to the embodiment of the method. The characteristics of the method are the system are corresponding, and can be referred to each other, which will not be repeated herein.

In summary, according to the technical solution of the present disclosure, the carbonized matter is effectively removed by moving the each core wire in the molten tin along a direction perpendicular to the core wire row. There is carbonized matter blocked between the bonding pad and the core wire, after the alignment is performed, such that the inner core conductor of the each core wire on the moving direction side is respectively in contact with a bonding pad. Thereby, the temperature transfer effect of the automatic soldering is improved, the yield of the automatic soldering is greatly improved, and the consistency and the yield of the automatic soldering are more stable.

It should be noted that although the specific implementation of the present disclosure is described in detail with reference to the drawings, it should not be construed as limiting the scope of protection of the present disclosure. Within the scope described in the claims, various modifications and variations made by those skilled in the art without creative work still fall within the protection scope of the present disclosure.

The examples of the present disclosure are intended to explain the technical features of the present disclosure concisely, so that those skilled in the art can intuitively understand the technical features of the present disclosure, and are not intended to be an improper limitation of the present disclosure.

The apparatus embodiments described above are merely schematic, and the units described as separate components may or may not be physically separated. Those of ordinary skill in the art can understand and implement without creative labor.

The above description shows and describes several preferred embodiments of the present disclosure, but as mentioned above, it should be understood that the present disclosure is not limited to the form disclosed herein, and should not be regarded as an exclusion of other embodiments, but can be used for other combinations, modifications, and environments, and can be altered within the scope of the application concept described herein, through the teachings above or related technology or knowledge in the relevant field. Modifications and changes made by those skilled in the art without departing from the spirit and scope of the present disclosure shall all fall within the protection scope of the claims attached to the present disclosure.

What is claimed is:

1. A method for tin immersion and soldering of core wire, characterized in, comprising:
    inserting a core wire row into molten tin vertically to melt an insulation skin on each core wire of the core wire row and complete pre-tinning of an inner core conductor;
    moving the each core wire in the molten tin along a direction perpendicular to the core wire row to remove carbonized matter from the each core wire on a moving direction side, wherein the carbonized matter is generated from the melted skin during the melting of the insulation skin;
    pulling the each core wire out of the molten tin; and
    performing alignment, such that the inner core conductor of the each core wire on the moving direction side is respectively in contact with a bonding pad.

2. The method according to claim 1, wherein the inserting a core wire row into molten tin vertically comprises:
    making ends for soldering of a plurality of core wires in a straight and ordered arrangement to obtain the core wire row; and
    inserting the core wire row into the molten tin vertically for 1 to 3 seconds.

3. The method according to claim 2, wherein a temperature of the molten tin is 380° C. to 420° C.

4. The method according to claim 1, wherein the moving the each core wire in the molten tin along a direction perpendicular to the core wire row comprises:
    moving the each core wire for 1 to 2 seconds.

5. The method according to claim 4, wherein the moving the each core wire in the molten tin along a direction perpendicular to the core wire row comprises:
    moving the each core wire for 20 to 40 mm.

6. The method of claim 1, wherein the pulling the each core wire out of the molten tin comprises:
    pulling the each core wire out of the molten tin within 0.1 to 0.3 seconds.

7. The method according to claim 1, further comprising:
    soldering the each core wire to the bonding pad after the alignment is performed.

8. The method according to claim 2, further comprising:
    soldering the each core wire to the bonding pad after the alignment is performed.

9. The method according to claim 3, further comprising:
    soldering the each core wire to the bonding pad after the alignment is performed.

10. The method according to claim 4, further comprising:
    soldering the each core wire to the bonding pad after the alignment is performed.

11. The method according to claim 5, further comprising:
    soldering the each core wire to the bonding pad after the alignment is performed.

12. The method according to claim 6, further comprising:
    soldering the each core wire to the bonding pad after the alignment is performed.

* * * * *